United States Patent
Fichou et al.

[11] Patent Number: 5,909,443
[45] Date of Patent: Jun. 1, 1999

[54] ATM NETWORK CONGESTION CONTROL SYSTEM USING EXPLICIT RATE CELL MARKING

[75] Inventors: Aline Fichou, La Colle sur loup; Serge Fdida, Alfortville; Claude Galand, Cagnes/Mer, all of France; Gerald Arnold Marin, Chapel Hill, N.C.; Raif O. Onvural; Ken Van Vu, both of Cary, N.C.

[73] Assignee: International Business Machines Corporation, Armonk, N.Y.

[21] Appl. No.: 08/780,149

[22] Filed: Jan. 3, 1997

[51] Int. Cl.⁶ .................................................. H04L 12/26
[52] U.S. Cl. ...................... 370/412; 370/236; 370/468; 370/414; 370/416
[58] Field of Search ................................. 370/412, 236, 370/468, 232, 234, 414, 416, 418

[56] References Cited

U.S. PATENT DOCUMENTS 5,636,212  6/1997  Ikeda ........................................ 370/233
5,754,530  5/1998  Awdeh et al. ............................ 370/232

*Primary Examiner*—Jeffery A. Hofsass
*Assistant Examiner*—Rafael A. Perez-Pineiro
*Attorney, Agent, or Firm*—Gerald R. Woods

[57] ABSTRACT

An explicit rate algorithm is disclosed for use in an end-to-end closed loop flow control algorithm for an ATM network which carries at least constant bit rate (CBR) traffic, variable bit rate (VBR) traffic and adjustable bit rate (ABR) traffic. The algorithm determines how much additional bandwidth is available for ABR traffic on an output link from a node and produces an explicit rate variable that can be forwarded to a source for the ABR traffic. Both the maximum and minimum bandwidths already reserved for all connections on the output link are determined. A single reserved bandwidth value is chosen within the range defined by the maximum and minimum reserved bandwidth values. The current utilization of the ABR input buffer for the node is also determined. The explicit rate variable is generated as a function of the link capacity, the reserved bandwidth value and the current utilization of the ABR input buffer. The explicit rate variable is written into a resource management cell which is routed through the network to the ABR traffic source. The explicit rate variable is intended to change the input rate of the ABR source to utilize more of the ABR input buffer.

14 Claims, 5 Drawing Sheets

ATM NETWORK CONGESTION CONTROL SYSTEM USING EXPLICIT RATE CELL MARKING

FIELD OF THE INVENTION

The present invention relates to a data communications network and more particularly to a data communication network having a closed-loop flow or congestion control system using explicit rate cell marking for regulating the transmission rate of network traffic sources.

BACKGROUND OF THE INVENTION

In early data communications networks, data flow control and error detection/recovery were typically performed at each intermediate node or system on the path between the source and destination systems. The hop-by-hop operations were believed to be needed to deal with data lost or corrupted as result of using the then-available high error rate data transmission technology and media.

Data transmission technology and media have improved over time, allowing data communications networks to evolve into systems in which flow control and error detection/recovery can become primarily the responsibility of nodes at the end points of a network data path. An effort is being made to minimize packet processing operations (and the time required to perform such operations) at intermediate nodes to reduce the time required to move the data from source to destination; that is, to increase system throughput.

Asynchronous Transfer Mode or ATM technology is an increasingly pervasive example of technology in which flow control and error detection/recovery are typically performed only at end nodes on a data path. In ATM systems, all data is transported in relatively short fixed length cells. Standard ATM cells have a five byte header, which carries cell control and routing information, and a forty-eight byte payload, which normally carries actual user data. The advantage of using fixed length cells is that such cells can be switched at extremely high speeds by special purpose hardware switches within the ATM network.

While the ATM cell structure may be standard, the data transported in such cells may represent divergent types of information, which have divergent, sometimes inconsistent characteristics and transport requirements. Transported data may represent computer data or audio information or image information. Examples of audio information include human speech or music. Examples of image information include "live" video or photographs or graphic or medical images.

Where the data being transported represents audio or video information, a loss of a certain amount of the data during transmission generally can be tolerated before the quality of the reconstructed audio or video information is noticeably degraded. However, certain kinds of such data, such as live video signals or speech, cannot be excessively delayed or subject to cell-to-cell end-to-end variations in transit time (that is, be subject to jitter) without causing a significant loss of quality of the reconstructed audio or video information. In contrast, a certain level of transmission delay or jitter is tolerable for computer data while loss or corruption of such data is generally intolerable.

Data which must be delivered with low tolerances on delay or jitter is characterized as real-time (RT) data. Data which is delay-tolerant is characterized as non-real-time (NRT) data. In most, but not necessarily all, cases, RT data is loss-tolerant while NRT data is loss-intolerant.

Any data communications network, including an ATM network, has a limited capacity (bandwidth) available for the transport of user data. The goal of a network designer or administrator is to consistently use as much of that bandwidth as possible while continuing to satisfy loss and/or delay requirements for the different kinds of data that are transported. Generically, loss and delay requirements are referred to as Quality of Service or QOS requirements.

In an ATM network, a connection is normally set up each time a source node wishes to send data to a destination node in the network. The connection setup includes the selection of a route or path through the network and the establishment of service parameters and QOS guarantees for the duration of the connection. Multiple connections between different source-destination pairs can concurrently use the same physical link in the network. To accommodate the different service requirements of different kinds of traffic in an ATM network, different classes of ATM traffic have been defined. The defined classes of interest here are CBR (Constant Bit Rate), VBR (Variable Bit Rate) and ABR (Available Bit Rate).

CBR traffic is traffic that needs to be transmitted at a specified, substantially constant bit rate. Examples of CBR traffic include real-time audio or video traffic or an ATM network connection emulating a standard T1 (1.544-Mbit/s) line. CBR traffic is delay and jitter intolerant. During set up of a CBR, a Peak Cell Rate (PCR) must be negotiated to define the maximum rate at which data can be transported without creating a significant risk of cell loss. Data is typically then transmitted at the negotiated PCR rate. If an attempt in made to transmit traffic at a rate exceeding the PCR, the excess traffic may be discarded by the network.

VBR traffic includes two subclasses of traffic—VBR real-time (VBR-RT) and VBR non-real-time (VBR-NRT). VBR-RT traffic is traffic which may be generated at varying rates (that is, be bursty) while still requiring tight limits on acceptable limits of cell jitter. Examples of VBR-RT traffic include video signals generated by a variable-rate codec or aggregated voice traffic with silence removal. VBR-NRT traffic is traffic which may be bursty but which is more delay tolerant than VBR-RT traffic. An example of VBR-NRT traffic includes traffic resulting from transaction processing, such as credit verification or other point-of-sale operations.

For each VBR connection to be set up, a Peak Cell Rate, a Sustained Cell Rate (SCR) and a jitter tolerance value must be negotiated. The negotiated SCR represents the average throughput to be permitted over the connection. While traffic may be accepted from a VBR source at rates exceeding the negotiated SCR for short periods of time (as long as the excess rates don't exceed the negotiated PCR), the rate at which traffic will subsequently be accepted from the same source must be reduced below the SCR sufficiently to maintain the negotiated SCR over a longer period of time. To assure that the SCR parameter can be observed over a relatively long period of time, still another parameter, a burst tolerance, must be established when the connection is being set-up. Burst tolerance defines how long a VBR connection will be allowed to accept traffic at rates greater than SCR before the traffic rate is reduced below SCR to maintain an overall throughput not exceeding SCR.

During these periods of reduced traffic activity and perhaps at other times during network operation, a significant amount of network bandwidth may be unused or idle. The ABR traffic class has been defined in an effort to exploit the availability of idle network bandwidth. ABR traffic is intended to make optimum use of what might otherwise be unused network bandwidth while utilizing traffic management techniques to monitor actual or incipient network congestion which might, if not taken into account, lead to unacceptable cell loss during transmission attempts.

The setup of an ABR connection requires negotiation of the same kind of PCR parameter that exists for a VBR connection. The PCR parameter serves the same purpose for both kinds of connections; namely, to limit the maximum rate at which traffic will be accepted for transmission over the connection. No effort is made to negotiate jitter or burst tolerances for ABR traffic. Instead, the ABR source and the network negotiate a Minimum Cell Rate (MCR) parameter representing the minimum amount of connection bandwidth that will always be available to the ABR traffic source. Generally, the MCR parameter represents the minimum transmission rate which must be available if the ABR traffic source or application is stay alive; i.e., continue to execute.

For CBR and VBR connections in an ATM network, no effort is made to dynamically control congestion (network traffic loads) from within the network. If, however, the goal is to utilize idle network bandwidth, it makes sense to attempt to dynamically control congestion through the use of a closed-loop congestion management techniques. Such techniques monitor network traffic and provide feedback to a traffic source to permit that source to adjust the rate at which traffic is made available to the network to levels which assure that existing QOS requirements continue to be observed.

A simple type of end-to-end control loop uses Explicit Forward Congestion Indicator (EFCI) messages generated by intermediate switches on a data path. An intermediate switch capable of supporting EFCI operation can set an EFCI indicator in the header of an in-transit regular data cell to indicate that the network is congested at the intermediate switch. When the cell reaches the connection destination, the destination node stores the congestion information until it receives a special Resource Management (RM) cell from the source node. The destination node writes the congestion information into the RM cell and returns that cell to the source node.

Some intermediate switches don't explicitly support EFCI operation but can write congestion information into Congestion Indicator (CI) and No_increase Indicator (NI) bits in a regular data cell header. The CI/NI information is forwarded to the destination node and stored there until a RM cell can be returned to the source node.

For either EFCI or CI/NI operation, the source node responds to a congestion notification in an RM cell by reducing its transmission rate. In either an EFCI or a CI/NI control loop, the intermediate switches play a very limited role, providing only a binary indication (congested or not congested) rather than a quantitative indication of the degree of congestion or the level of available bandwidth. Therefore, there is no assurance that the response of the source node will be appropriate for the actual congestion conditions in the network.

A more sophisticated feedback mechanism, identified as Explicit Rate Marking (ERM), allows the intermediate switches to play a larger role in the control of network congestion. Generally speaking, a switch implementing ERM feedback can provide quantitative information about the amount of bandwidth available at a given time at the switch. When such information is made available to the source station through the use of RM cells, the source station can respond by adjusting the transmission rate to a level which results in improved utilization of the idle bandwidth.

Different algorithms or methods can be used to generate ER values. One proposal, R. Jain, "A Sample Switch Algorithm," ATM_Forum/95-0178R1, February 1995, is for each intermediate switch on a path to monitor the load on each outgoing link to determine the overload factor and the number of active ABR connections on that link. The overload factor for a link is a function of the input rate N/T and the target cell rate $U^*C$ where N is the number of cells received during a time period T, $U^*$ is the target link utilization factor and C is the capacity or bandwidth of the link. The target link utilization factor $U^*$ is always less than 100%, and is preferably is on the order of 80%–90%, reflecting the reality that 100% of a link's theoretical capacity is not going available for use in a real network.

The overload factor is defined as the ratio of the input rate over the target cell rate; that is, $N/(TU^*C)$. Under this approach, an $Er_i$ value for ABR connection i is:

$$ER_i = \max\left[\frac{(U^*C)}{n}, CCR_i \frac{(TU^*C)}{N}\right]$$

where n is the number of active ABR connections and CCR is the current cell rate, the rate at which cells are currently being transmitted over the connection.

One disadvantage of the above algorithm is that it ignores ABR buffer capacity, which might be available at any given time.

Another proposal is set forth in A. Barnhart, "Explicit Rate Performance Evaluation," ATM_Forum/94-0983, October 1994. According that proposal, each intermediate switch on a data path makes measurements which permit it to determine the actual input rate and the target output rate for an ABR connection. A connection-explicit ER value is established as a function of the ratio of the actual input rate to the target output rate. Connections which have an actual input rate less than the target output rate are allowed to increase their transmission rate. Conversely, connections which have an actual input rate exceeding their target output rate are required to reduce their transmission rate.

The proposal does not define how current available bandwidth is determined or how the target output rate for an ABR connection is derived. Both of these are described in the technical description of the present invention.

SUMMARY OF THE INVENTION

The present invention involves flow control for data traffic on a link on a path between a source node and a destination node, both of which are part of a data communications network also having one or more intermediate nodes, each having an input buffer for temporarily storing traffic being delivered to the node. The flow control is implemented in at least one intermediate node for a given output link. A flow control variable is generated as a function of the currently unreserved link capacity and the currently available capacity of the input buffer. The flow control variable is forwarded along the data path to the source node to instruct the source node how the source traffic rate is to be altered to make better use of the available bandwidth, including the "bandwidth" represented by free memory in the input buffer.

BRIEF DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DESCRIPTION OF PREFERRED EMBODIMENTS

Figure 1:
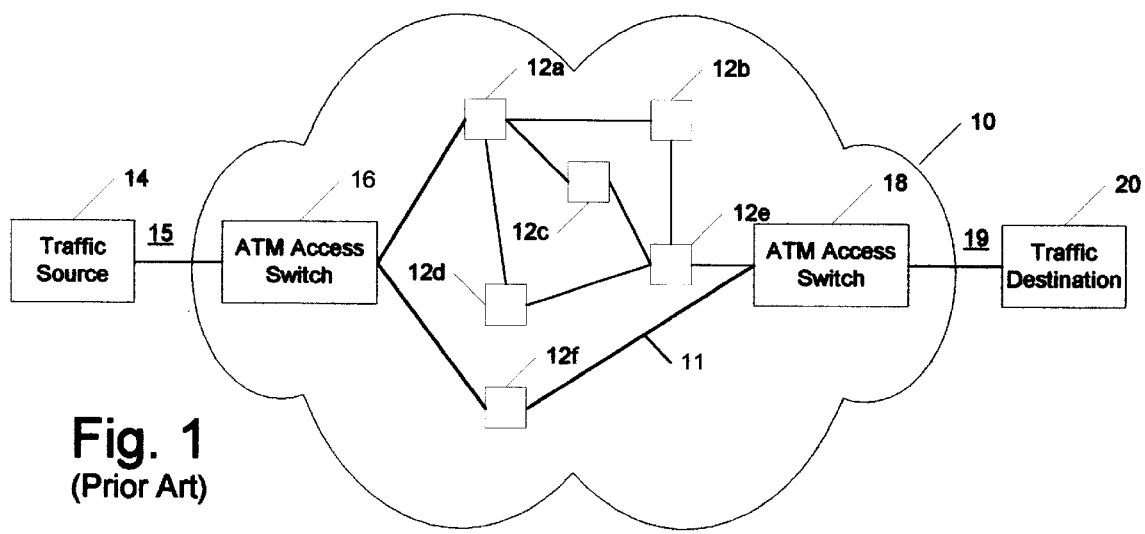
FIG. 1 is a schematic representation of an Asynchronous Transfer Mode (ATM) network within which the present invention may be used.

As shown in FIG. 1, an ATM system is commonly referred to as including a cloud 10, cloud being a term of art that collectively represents the various nodes (communication systems) and links (transmission media) that are within the system. For a particular data path set up between a traffic source 14 and a traffic destination 20, the nodes can be characterized as intermediate nodes, such as nodes 12a through 12f, or endpoint nodes. An endpoint node would be either a source or destination system in combination with the hardware and software needed to access the remainder of the ATM network. The combination of traffic source 14 and an ATM access switch 16 is an example of a source endpoint 15 while the combination of traffic destination 20 and an ATM access switch 18 is an example of a destination endpoint 19.

It needs to be understood that the role (and characterization) of any particular node may change for different network connections. For example, for a different connection, endpoint 19 might either serve as a traffic source or as an intermediate node on a path between two other nodes.

The various nodes are shown as being interconnected by links, such as link 11. The representation of the links is not intended to imply that all of the links are the same. Each link may be any of several known types of media capable of supporting high speed digital traffic, including copper wire, optical fiber or even microwave or satellite wireless links.

Figure 2:
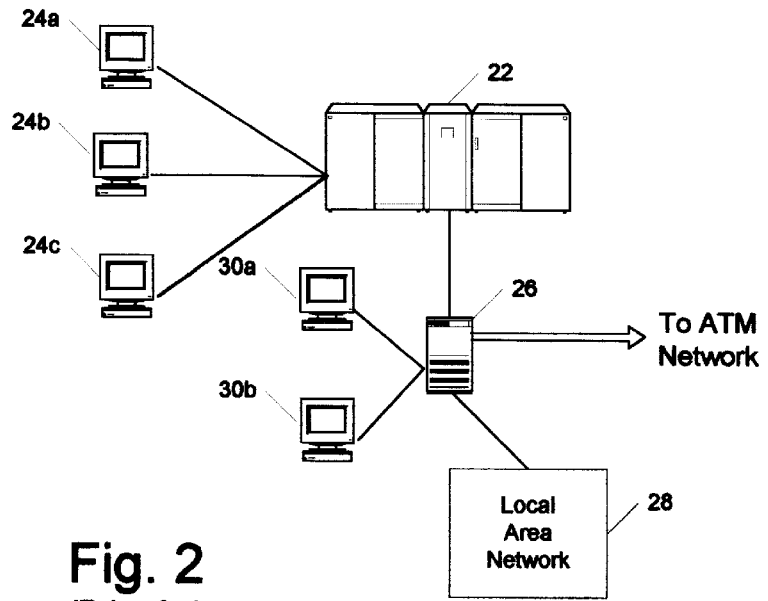
FIG. 2 is illustrative of the kinds data processing and/or communication equipment which can exist at a node in an ATM network.

FIG. 2 is a more detailed representation of the kind of data processing equipment that might be found at a typical node in an ATM system. The node could include a mainframe 22 with a number of directly connected terminals, such as terminals 24a, 24b and 24c used to support input/output operations for a transaction processing application, such as credit card verification. The node would also include an ATM access switch 26 connected both the remainder of the ATM network (not shown) and to the mainframe and possibly to a local area network 28 and one or more terminals, such as terminals 30a and 30b, used in a high bandwidth application, such as a videoconferencing application. In a given installation, additional controllers or network elements, such as a communication controller or a router, might be part of the system. For example, a router or a communication controller (neither of which is shown) might be interposed between the mainframe 22 and the ATM access switch 26. Similarly, the terminals 24 might be connected indirectly to mainframe 22 through a display controller (not shown).

An ATM access switch can perform a number of functions in a typical system. The access switch may serve to aggregate or concentrate data provided by the various connected components. Also, where the connected components, generate data in something other than native ATM cell format, the access switch may perform necessary segmentation/operation/sequencing operations to convert the data from its original format to the standard ATM cell format.

Figure 3:
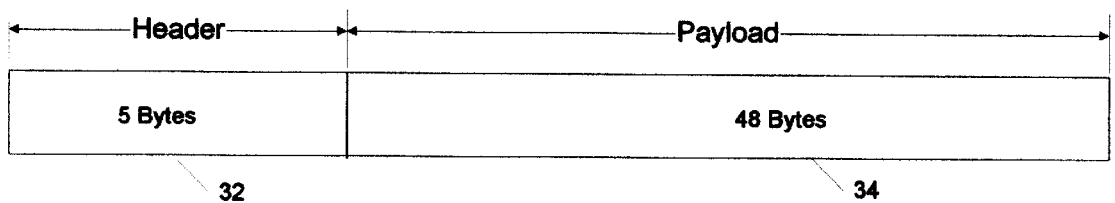
FIG. 3 depicts the overall structure of a standard ATM data cell.

FIG. 3 shows the major elements of a standard ATM cell; namely, a five byte header 32 and a forty-eight byte payload 34. The header 32 contains routing and cell control information. When a connection is set up between two endpoints, the path through the network is defined and is identified by the contents of VPI (Virtual Path Identifier) and VCI (Virtual Channel Identifier) fields in the header. The header further includes a three bit Payload Type Indicator (PTI) field which identifies the cell as a specific type of user data cell or a control cell, such as a Resource Management cell. A single bit Cell Loss Priority (CLP) field determines whether the cell should be discarded if network congestion is detected. Finally, the header includes a Header Error Correction (HEC) field which can be used to a cell having a corrupted header and for cell delineation purposes.

Figure 4:
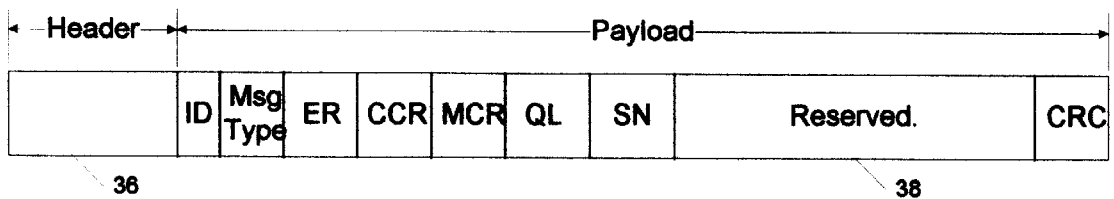
FIG. 4 depicts the fields of a Resource Management (RM) cell, a special form of ATM data cell.

A Resource Management (RM) cell is a special ATM cell conforming to the cell structure shown in FIG. 4 and generated by the source every Nrm-1 data cells where Nrm is a constant independent of source transmission rate . Like all other ATM cells, an RM cell has a five byte header 36 and a forty-eight byte payload 38. The RM payload, however, is divided into a number of fields, each of which serves a specific function in managing network operation. Table 1 below is a brief description of the fields of an RM cell.

TABLE 1

| NAME | LENGTH | DESCRIPTION |
| --- | --- | --- |
| ID | 1 byte | Identifies the service using the RM cell. |
| Msg Type | 1 byte | Flow control functions. See FIG. 5. |
| ER | 2 bytes | Explicit Rate - used in control of source transmission rate |
| CCR | 2 bytes | Current Cell Rate - current actual transmission rate |
| MCR | 2 bytes | Minimum Cell Rte - minimum available for ABR connection |
| QL | 4 bytes | Queue Length - not used for ABR service |
| SN | 4 bytes | Sequence Number - not used for ABR service |
| Res. | 30 + bytes | Reserved. Not currently used. |
| CRC | I + bytes | Cyclical Redundancy Check - error correction character |

The Reserved and CRC fields are described as 30+ and 1+ bytes, respectively, since one byte in the payload is allocated between six reserved bytes and two bytes which are used in defining a ten bit CRC character.

Figure 5:
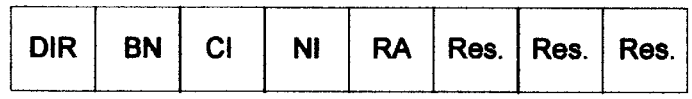
FIG. 5 is an expanded view of the bits in a Message Type field in an RM cell.

FIG. 5 is an expanded view of the subfields of the Msg Type field in the RM cell with each subfield being one bit in length. The content of the DIR subfield indicates the direction of data flow associated with the RM cell. The content of the BN field indicates whether the RM cell is a Backward Explicit Notification Cell (BECN) generated by a destination or intermediate switch. The CI (Congestion Indicator) bit can be set to indicate congestion in the network while the NI (No_increase Indicator) bit can be used to prevent a source from increasing actual transmission rate. The RA bit is not used for ABR service and the Res. bits are, of course, reserved for future implementation of yet-undefined functions.

Figure 6:
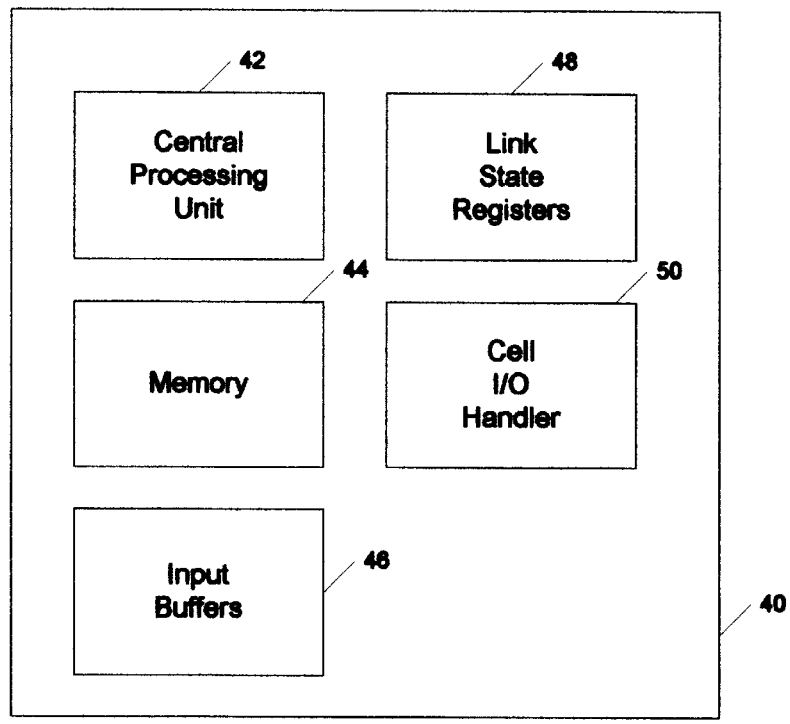
FIG. 6 is a high level view of components of a data processing/handling system which can be used to implement the present invention.

The present invention is a specific technique for controlling ABR source transmission rates using ER cell marking. While the technique might be implemented in special purpose hardware components, it is most likely to be implemented in a switch control system using general purpose data processing components such as those shown in FIG. 6. A typical system 40 would include a central processing unit 42, control and data memory 44, cell input buffers 46 for temporarily storing cells received from other nodes in the network, link state registers 48 for storing information about the state of various links connected to the system and a cell I/O handler 50 for performing necessary input/out and switching functions. The specific types of functions which would be implemented in each of the components will be described below with reference to other figures.

Figure 7:
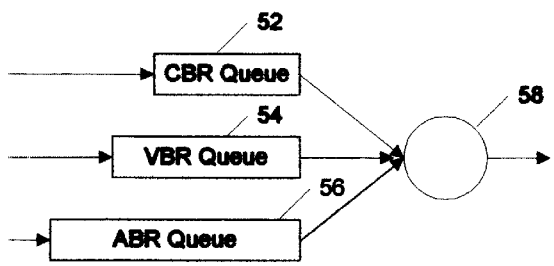
FIG. 7 shows the input queue or buffer structure for a typical ATM switch.

An ATM node includes cell transmission queues for providing temporary cell storage at the input to the ATM switch. Different queues are used for different classes of ATM traffic although each queue operates on a First-In First-Out basis. Referring to FIG. 7, three separate queues 52, 54, and 56 are shown for CBR, VBR and ABR traffic respectively with the output of the queues providing a single input stream for an ATM switch 58 at the node. The queues are processed in the following order: CBR, VBR, ABR. As would be expected from the earlier definition of CBR service, cells in the CBR queue are given the highest priority since any cell in the CBR queue may need to processed to maintain the constant bit rate negotiated for a CBR connection. ABR cells are transmitted only if there is no cell waiting in either of the CBR or VBR queues.

Figure 8:
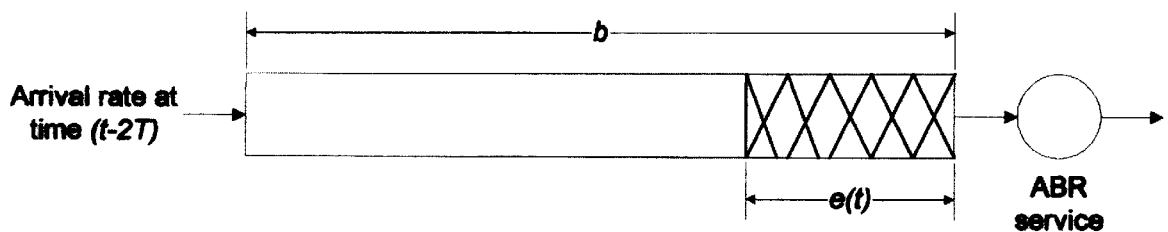
FIG. 8 shows an ABR connection input buffer which is only being partially utilized.

As noted previously, an ABR traffic class was defined in order to permit utilization of network bandwidth when that bandwidth is not being used for CBR or VBR traffic. In determining how much bandwidth is available at any given time at a node, the "bandwidth" represented by the ABR input buffer for that node can be taken into account. FIG. 8 is a schematic representation of an ABR input buffer having a maximum storage of b cells. At any given time t, only e(t) cell positions are occupied with the remainder of the buffer positions being available.

The extent of utilization of the ABR input buffer at any given time is directly related to the current traffic rates for the higher priority VBR traffic as well as the current traffic rate for ABR traffic itself. Put slightly differently, the ABR input buffer will be more heavily utilized whenever there is more VBR traffic since processing of CBR and VBR cells takes priority over processing of ABR cells. As will be described below in detail, the extent of current ABR input buffer utilization is a measure of current VBR traffic and can be used in generating Explicit Rate (ER) values.

Figure 9:
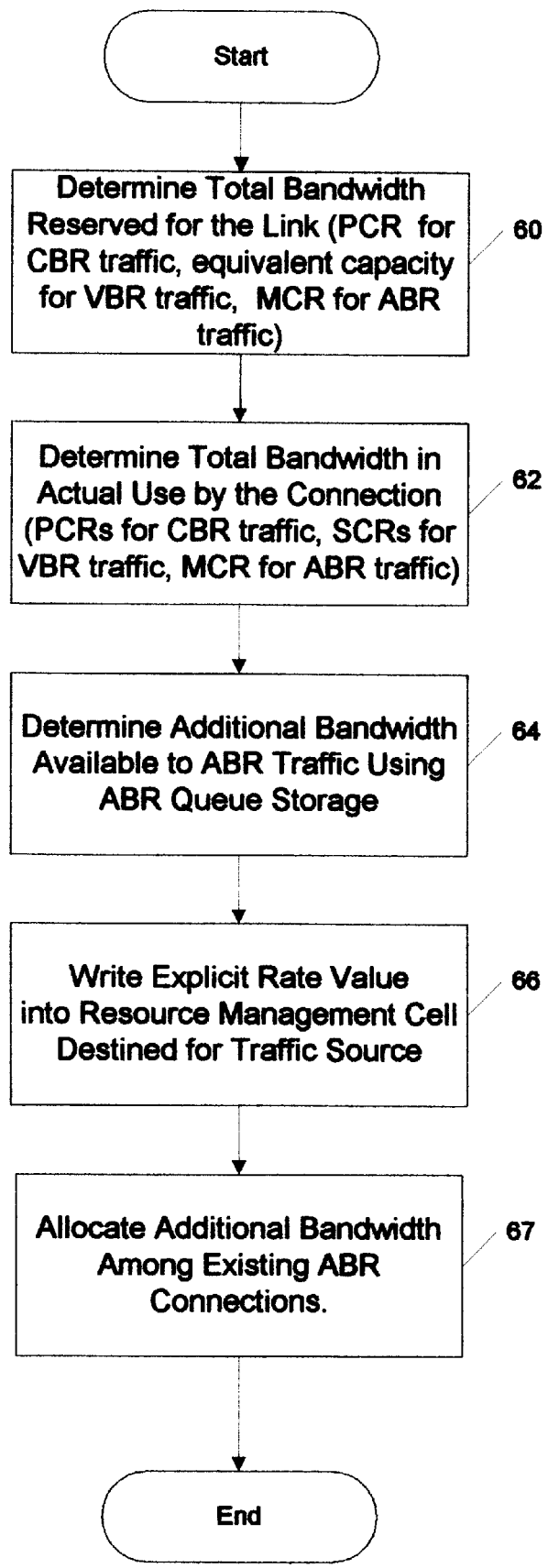
FIG. 9 is a high level flow chart of a process for implementing the present invention.

The process for generating an ER value for a given link is shown at a relatively high level in FIG. 9. The total bandwidth reserved for existing connections on the link is established in an operation 60 by summing the amounts of bandwidth reserved for existing CBR, VBR and ABR connections. More specifically, and has already been noted, each CBR connection is reserved enough bandwidth to support transmission at a negotiated PCR rate while each ABR connection is reserved enough bandwidth to support cell transmission at a negotiated MCR rate. Additionally, bandwidth must be reserved for each existing VBR connection.

One technique for calculating an appropriate amount of network bandwidth to be reserved for VBR traffic is set forth in U.S. Pat. No. 5,289,462, issued Feb. 22, 1994 and assigned to the assignee of the present invention. That patent discloses an approach for calculating an "equivalent capacity" needed to support a VBR source having known metrics and reserves the appropriate amount of bandwidth. While the "equivalent capacity" technique is considered to have significant advantages, other techniques for determining VBR traffic reservations might be used.

The total reserved bandwidth for the connection is simply the summation of all PCR reservations, all VBR reservations and all MCR reservations for existing ABR connections.

The next step 62 in the ER process is to determine a lower limit or bound for the link bandwidth that is expected to be in use at a given time. Since it is assumed that CBR connections transmit at their negotiated PCR rates, the total minimum bandwidth expected to be needed for CBR connections is the summation of all PCR values negotiated in support of CBR connections. Similarly, since it is assumed that each ABR connection must utilize at least the negotiated MCR rate in order to keep an associated application operational, the total minimum bandwidth needed to support existing ABR connections is obtained by summing the MCR rates already negotiated for ABR connections. For a VBR connection, the minimum bandwidth required over a given measurement period is equal to the Sustained Cell Rate or SCR value negotiated for that connection. As noted above, the assumption is made that the VBR source will maintain cell transmission at the negotiated SCR rate over a given period with the actual VBR traffic rate at a given time possibly being higher or lower than the negotiated SCR rate.

The lower bandwidth limit can, therefore, be calculated as the summation of the PCR's for existing CBR connections, the SCR's for existing VBR connections and the MCR's for existing ABR connections on the link.

Once the upper and lower limits on available bandwidth are determined, the amount of additional idle bandwidth that might be made available for ABR service must be determined in an operation 64. As will be explained in considerably greater detail below, the current occupancy level or utilization of the ABR input buffer is a significant factor in making this determination.

Once the amount of additional available bandwidth is determined, an Explicit Rate value can be written into a Resource Management (RM) cell in an operation 66. Although the contents of all RM cells are intended for the ultimate use of the ABR traffic source, the cells may either sent backward toward the source or forward toward the destination, which will then turn the cells around for transfer back to the source. More details will be provided on this later. Finally, the switch allocates the additional extra bandwidth among the existing ABR connections on the link in an operation 67. Possible bases for this allocation are described later.

Explicit rate values are performed for each output link from the intermediate node performing the calculations. The calculations, which will be described in detail below, use a number of variables, each of which is defined in the following list:

$PCR_i$ is the amount of bandwidth reserved for a CBR connection i on the link;

$SCR_j$ is the sustainable cell rate for a VBR connection j on the link;

$C_T$ is the total link capacity;

$C_R$ is the total amount of bandwidth reserved on a given link;

$C_U$ is the total amount of bandwidth used on a given link;

$C^*$ is the estimated extra (in addition to MCR) bandwidth available for ABR connections on the link;

$C_{ABR}$ denotes the estimated amount of bandwidth available for ABR traffic on the link;

$c_j$ is the amount of bandwidth reserved for a VBR connection j;

b is the size of the ABR buffer;

e(t) denotes the ABR queue buffer occupancy at time t;

T is an estimate of the delay from source to switch or to destination, depending on the marking technique being used; and α is the target utilization for a given link.

The main objective of an ER algorithm is to determine $C_{ABR}$, the estimated amount of bandwidth available for ABR traffic on a given link at time t based on the traffic behavior of CBR and VBR connections multiplexed on the same link.

Since the network guarantees certain cell rates for CBR, VBR and ABR traffic, the total bandwidth reserved on a given link CR is given by:

$$C_R = \sum_i PCR_i + \sum_j c_j + \sum_k MCR_k. \quad (1)$$

The total bandwidth used by all connections on a given link can be estimated as:

$$C_U = \sum_i PCR_i + \sum_j SCR_j + \sum_k MCR_k. \quad (2)$$

In equation (2) above, it is assumed that each CBR connection transmits at its negotiated peak cell rate PCR and that a VBR connection never exceeds its negotiated sustainable cell rate SCR over a given measurement period.

The estimated lower limit or bound for $C^*$, the amount of bandwidth available for ABR connections exclusive of MCR bandwidth already reserved, is given by:

$$C^* = \alpha C_T - C_R \quad (3)$$

while the estimated upper limit or bound for C is given by:

$$C^* = \alpha C_T - C_U \quad (4)$$

The magnitude of $C^*$ can be viewed as a function of the burstiness of VBR connections on the same link. The greater the burstiness of a VBR connection, the greater the amount of bandwidth that should be reserved for that connection. However, since a bursty VBR connection will not necessarily be utilizing all of the reserved bandwidth at any given time, a greater amount of that reserved bandwidth is potentially available for use by an ABR connection at any given time. This is not to say that a greater amount of the reserved VBR bandwidth will always be available. If a VBR source is bursting (producing traffic at a high data rate relative to a "normal" data rate), then the reserved VBR bandwidth obviously should be made available to the VBR source and not to an ABR source.

While the upper and lower bounds of a range of values for $C^*$ are defined by equations (3) and (4), a single $C^*$ value is needed for subsequent computations. The single value could arbitrarily be selected as midway between the upper and lower bounds or could be left to the discretion of a network administrator. For well-behaved networks (minimal burstiness), the network administrator might choose a value toward the upper bound. For poorly-behaved networks, a value closer to the lower bound could be chosen.

As noted earlier with reference to FIG. 2, the utilization of the ABR input buffer at any given time depends to the utilization of the queues for the higher priority CBR and VBR traffic. When VBR traffic is bursting both the VBR input buffer and the ABR input buffer will be more heavily utilized. The degree of utilization of the occupied ABR queue at a given time can be used to determine the amount of extra bandwidth that should be considered available to an ABR connection. Where $C_{ABR}(t)$ represents the transmission capacity that can be used by ABR traffic at time t:

$$C_{ABR(t)} = C^* + \frac{b}{2T}\left(1 - \frac{e(t)}{b}\right) = C^* + \frac{b - e(t)}{2T} \quad (5)$$

In the above equation, the term 2T represents the time required for a RM cell to be received by the ABR traffic source and for any change in traffic rates made by the source to propagate back to the node at which the RM cell was generated. Hence, the target rate is the currently provisioned ABR traffic transmission capacity $C^*$ plus the bandwidth required to fill up the unused ABR buffer capacity (b-e(t)) during the time 2T it takes for the control to become effective.

The manner in which T is determined depends on the type of explicit rate cell marking used in the network. There are currently three known ways to communicate an explicit rate marked cell from a node at which it is generated to the source at which the ABR traffic rate is to be adjusted. The first way is forward marking, under which the FRM cell is forwarded from the generating switch to the traffic destination and then turned around at the destination for return to the traffic source. Where forward marking is implemented, the time 2T is the summation of the switch/destination/source/switch cell transit times while T is actually equal to the source/destination cell transit time.

The second way of forwarding RM cells is referred to as backward marking. In a system implementing backward marking, a switch computes an explicit rate value and writes it into an RM cell generated elsewhere and already en route back to the source. The third way of forwarding RM cells is referred to as asynchronous marking. In an asynchronous marking system, the switch generates its own RM cell and sends it directly back to the source. For backward and for asynchronous marking systems, 2T is the summation of the switch/source/switch cell transit time and T is simply the switch/source cell transit time.

Since all ABR connections are processed in a single global ABR queue, connections that have a smaller value of T may be given a higher rate as compared to connections that have a higher T value. A preferred solution to this fairness problem is to use the maximum value of T from all connections passing through the queue.

Equation 5 assumes network traffic will always be well behaved and will never exceed negotiated parameters. That assumption is optimistic and it would be imprudent to assume that the transmission capacity value defined by Equation 5 could always be achieved without cell losses. A more conservative approach is to establish a target utilization value r (r<1) for the ABR queue and a conservatism factor h to limit how fast a rate change can be made. Equation (5) can then be rewritten to:

$$C_{ABR(t)} = C^* + \frac{hb}{2T}\left(r - \frac{e(t)}{b}\right). \quad (6)$$

Based on experimental results, an appropriate value for h is on the order of 0.25 while an appropriate factor r is on the order of 0.9±0.05. Using these values, equation 6 reduces to:

$$C_{ABR(t)} = C^* + \frac{0.9b - e(t)}{8T}. \quad (7)$$

Since $C_{ABR}(t)$ is the total bandwidth available to ABR connections and a part of this transmission capacity must be used by the RM cells generated regularly every $N_{rm}$-1 user data cells, the bandwidth available for user data cells is bounded by:

$$C_{ABR(t)} = \frac{N_{rm} - 1}{N_{rm}} \left[ C^* + \frac{0.9b - e(t)}{8T} \right]. \quad (8)$$

Once the total bandwidth available to ABR connections on the link is computed and the MCR value for each connection has been granted, the additional available bandwidth must be distributed among the existing ABR connections. A first approach is simply to divide the extra bandwidth equally among competing ABR connections. A fairness function for this approach can be defined as:

$$ER_i = \max \left[ \frac{C^*}{n}, CCR_j + \frac{C_{ABR(t)} - \sum_{j=1}^{n} CCR_j}{n} \right]. \quad (9)$$

where $ER_i$ is the additional (to MCR) explicit rate allocated to connection i; $CCR_i$ is the current cell rate for connection i; and n is the total number of ABR connections. The value for CCR can be obtained from RM cells or from an actual measurement of the connection activity.

While sharing the extra bandwidth equally among existing connections is simple, it does not take into account that different ABR connections are likely to have different needs for extra bandwidth.

A second approach to bandwidth distribution is to allocate the bandwidth in proportion to the MCR values for the existing ABR connections. Put simply, an ABR connection with a higher Minimum Cell Rate would get more of the extra bandwidth than an ABR connection with a lower Minimum Cell Rate. A fairness function for distributing extra bandwidth in proportional to probable need can be defined as $$ER_1 = \max \left[ \frac{C^*}{n}, CCR_i + \left( C_{ABR(t)} - \sum_{j=1}^{n} CCR_j \right) \frac{MCR_j}{\sum_{j=1}^{n} MCR_j} \right] \quad (10)$$

Figure 10:
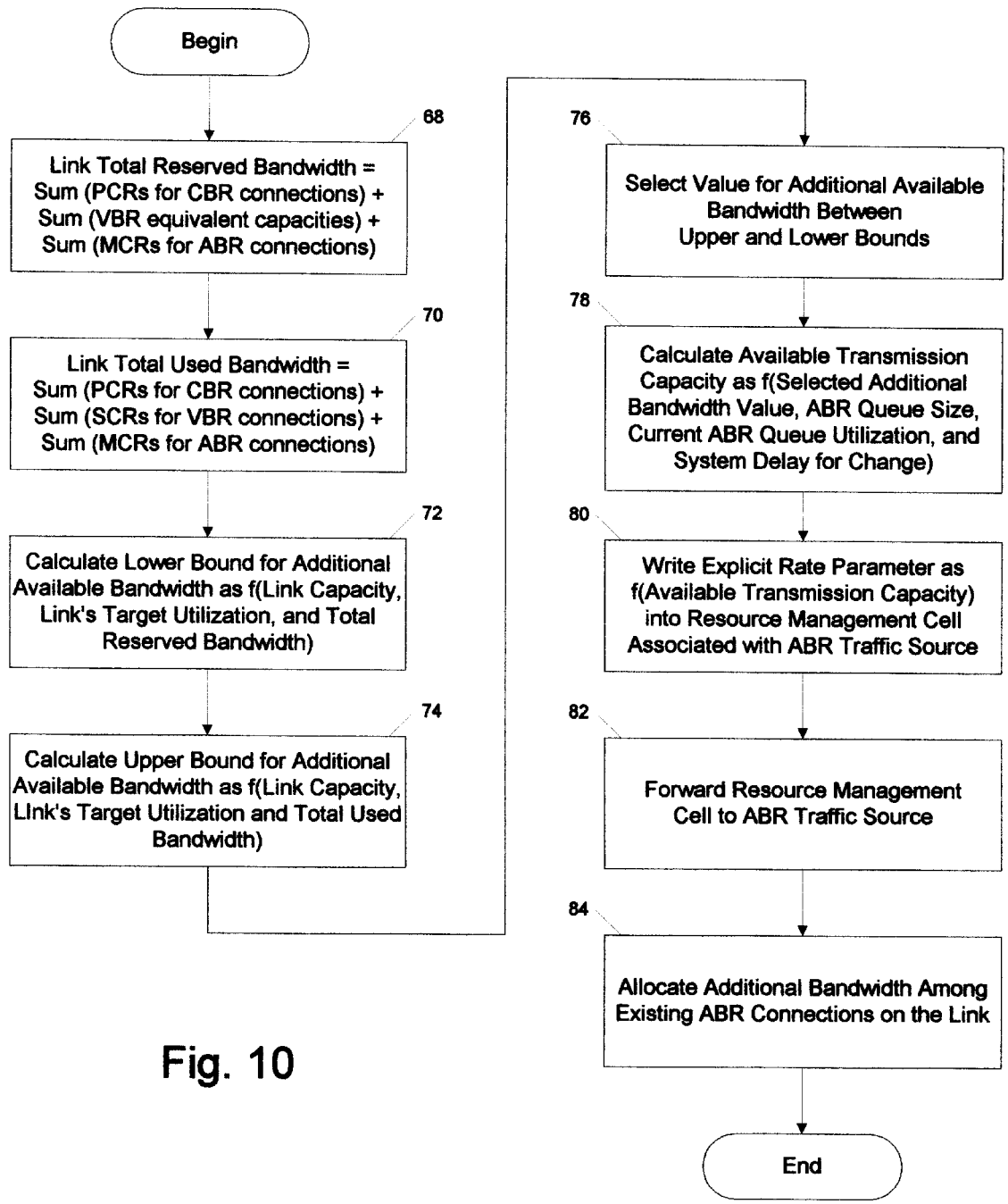
FIG. 10 is a more detailed representation of the process illustrated in FIG. 9.

FIG. 10 is a more detailed view of the explicit rate process described generally with reference to FIG. 9 earlier. The initial operation 68 is the determination of the total amount of bandwidth that has been reserved for the link in question. Operation 68 is basically an implementation of equation (1) described earlier and represents an upper limit on the amount of bandwidth committed to the link. The second operation 70 in the process is the determination of the total bandwidth that is expected to be needed by the link at any given time. The result of this operation is the lower limit on the amount of bandwidth to be allocated to the link. Operation 70 is an implementation of equation (2).

Once the upper and lower bandwidth limits have been determined, a lower bound for additional available bandwidth is determined in an operation 72 as a function of link capacity, link target utilization and total reserved bandwidth. Operation 72 is an implementation of equation 3. Operation 74, an implementation of equation 4, is executed to determined the upper bound for additional available bandwidth. Once the upper and lower bounds for additional available bandwidth are determined, a single value intermediate the bounds is selected in an operation 76. The single value may be anywhere in the range and may, if desired, be left to the discretion of a network administrator knowledgeable whether the network is bursty or not.

The total transmission capacity for the link can then be computed in an operation 78 as a function of the additional available bandwidth parameter, the size of the ABR queue for the link, the current utilization or occupancy of that queue and (if desired) a rate-of-change or delay parameter that will limit how quickly the transmission capacity can change from one calculation period to the next. Operation 78 can be viewed as an implementation of equation 5 or, if certain assumptions about network parameters are made, of equations (6) through 8.

As has already been noted, the basic idea is to treat the ABR input buffer or queue as a source of potential network bandwidth and to adjust the source transmission rate to make use of free buffer capacity.

Operation 80 causes an explicit rate parameter to be written into an RM cell, which is sent forward or backward (depending on the network's mode of operation) in an operation 82 toward the ABR traffic source. Final, the additional extra bandwidth is allocated among existing ABR connections on the link in an operation 84, preferably either through an equal distribution or through a needs-based distribution based on a factor such as the Minimum Cell Rate for each existing connection.

While there have been described what are considered to be preferred embodiments of the present invention, variations and modifications in those embodiments will occur to those skilled in the art once they are made aware of the basic inventive concepts. Therefore, it is intended that the appended claims shall be construed to include both the preferred embodiments and all such variations and modifications as fall within the true spirit and scope of the invention.

What is claimed is:

1. In a packet communications network including a plurality of nodes interconnected by transmission links, at least one of said nodes having at least one input buffer for temporarily storing packets delivered to the node, a flow control system for controlling the flow of packets on an output link from the node, said flow control system producing an explicit rate signal to be used to control the rate at which packets are provided to the node by a traffic source, said flow control system comprising:

means for determining the bandwidth reserved for existing packet traffic on the output link;

means for determining the unused capacity of an input buffer in which packets destined for the output link are temporarily stored;

means for generating an explicit rate parameter having a value dependent upon the capacity of the output link, the amount of link bandwidth already reserved, and the unused capacity of the input buffer; and means for forwarding the explicit rate parameter to the traffic source to enable the source to adjust the rate at which packets are provided to the network to more fully utilize the unused capacity of the input buffer.

2. A flow control system as set forth in claim 1 wherein said reserved bandwidth determining means comprises:

means for determining the maximum bandwidth reserved for existing packet traffic on the output link;

means for determining the minimum bandwidth reserved for existing packet traffic on the output link; and means for selecting a reserved bandwidth value in the range limited by the maximum and minimum reserved bandwidth.

3. A flow control system as set forth in either of claims 1 or 2 wherein said means for forwarding an explicit rate parameter comprises:

means for writing the parameter into a control cell; and means for forwarding the control cell into the network for delivery to the traffic source.

4. For use in a packet communications network including a plurality of nodes interconnected by transmission links, at least one of said nodes having an input buffer for temporarily storing packets delivered to the node, a flow control method for controlling the flow of packets on an output link from the node, said packets originating in a packet traffic source in the network, said method comprising the steps of:

determining the amount of bandwidth reserved for existing packet traffic on the output link:

determining the currently unused capacity of the input buffer;

generating an explicit rate parameter having a value dependent upon the capacity of the output link, the amount of link bandwidth already reserved for existing packet traffic on the output link and the currently unused capacity of the input buffer; and forwarding the explicit rate parameter to the traffic source to enable the source to adjust the rate at which packets enter the network to more fully utilize the unused capacity of the input buffer.

5. A method as set forth in claim 4 wherein the step of determining the amount of bandwidth reserved for existing packet traffic on the output link further comprises the steps of:

determining the maximum bandwidth reserved for existing packet traffic on the output link;

determining the minimum bandwidth reserved for existing packet traffic on the output link;

selecting a reserved bandwidth value in the range limited by the maximum and minimum values of bandwidth.

6. A method as set forth in either of claims 4 or 5 wherein the step of forwarding the explicit rate parameter further comprises the steps of:

writing the explicit rate parameter into a control packet;

sending the control packet through the network for delivery to the traffic source.

7. A packet communications network including a plurality of nodes, at least some of said nodes having input buffers for temporarily storing packets delivered to the nodes, a plurality of link interconnecting the nodes, and at least one flow control system for controlling the flow of packets on at least one of the nodes having an input buffer, said flow control system comprising:

means for determining the bandwidth reserved for existing packet traffic on the output link;

means for determining the unused capacity of the input buffer in which packets destined for the output link are temporarily stored;

means for generating an explicit rate parameter having a value dependent upon the capacity of the output link, the amount of link bandwidth already reserved, and the unused capacity of the input buffer; and means for forwarding the explicit rate parameter to the traffic source to enable the source to adjust the rate at which packets are provided to the network to more fully utilize the unused capacity of the input buffer.

8. A packet communications network having a flow control system as defined in claim 7 wherein said reserved bandwidth determining means comprises:

means for determining the maximum bandwidth reserved for existing packet traffic on the output link;

means for determining the minimum bandwidth reserved for existing packet traffic on the output link; and means for selecting a reserved bandwidth value in the range limited by the maximum and minimum bandwidth reserved.

9. A flow control system as set forth in either of claims 7 or 8 wherein said means for forwarding an explicit rate parameter comprises:

means for writing the parameter into a control cell; and means for forwarding the control cell into the network for delivery to the traffic source.

10. In an ATM packet communications network for carrying different classes of ATM traffic, including constant bit rate (CBR) traffic, variable bit rate (VBR) traffic and available bit rate (ABR) traffic, said network including a plurality of nodes interconnected by transmission links, at least one of said nodes having an input buffer for temporarily storing ATM packets delivered to the node, an explicit rate flow control system for controlling the flow of packets on an output tranmission link from the node, said flow control system comprising:

means for determining the bandwidth reserved for existing packet traffic on the output link;

means for determining the unused capacity of an input buffer in which packets destined for the output link are temporarily stored;

means for generating an explicit rate parameter having a value dependent upon the capacity of the output link, the amount of link bandwidth already reserved, and the unused capacity of the input buffer; and means for forwarding the explicit rate parameter to the traffic source to enable the source to adjust the rate at which ABR packets are provided to the network to more fully utilize the unused capacity of the input buffer.

11. A flow control system as set forth in claim 10 wherein said reserved bandwidth determining means comprises:

means for determinining the maximum bandwidth reserved for existing packet traffic on the output link, the maximum bandwidth reserved being determined by the total of reserved peak cell rates for existing CBR traffic, reserved equivalent capacities for existing VBR traffic and reserved minimum cell rates for existing ABR traffic;

means for determining the minimum bandwidth reserved for existing packet traffic on the output link, the minimum bandwidth reserved being determined by the total of reserved peak cell rates for existing CBR traffic, reserved sustainable cell rates for existing VBR traffic and reserved minimum cell rates for existing ABR traffic; and means for selecting a single reserved bandwidth value in the range limited by the maximum and minimum bandwidth reserved.

12. A flow control system as set forth in claim 11 wherein said means for forwarding an explicit rate parameter comprises:

means for writing the explicit rate parameter into a resource management cell; and means for forwarding the control cell into the network for delivery to the traffic source.

13. An article of manufacture comprising:

a computer readable medium having computer readable program code embodied therein for controlling the flow of packets on an output link from a node in a packet communications network including a plurality of nodes interconnected by transmission links, said node having an input buffer for temporarily storing packets delivered to the node, the computer readable program code in said article of manufacture comprising code for determining the amount of bandwidth reserved for existing packet traffic on the output link, code for determining the currently unused capacity of the input buffer, code for generating an explicit rate parameter having a value dependent upon the capacity of the output link, the amount of link bandwidth already reserved for existing packet traffic on the output link and the currently unused capacity of the input buffer, and code for forwarding the explicit rate parameter to the traffic source to enable the source to adjust the rate at which packets enter the network to more fully utilize the unused capacity of the input buffer.

14. An article of manufacture as set forth in claim 13 wherein the code for determining the amount of bandwidth reserved for existing packet traffic on the output link further comprises:

code determining the maximum bandwidth reserved for existing packet traffic on the output link;

code for determining the minimum bandwidth reserved for existing packet traffic on the output link; and code for selecting a reserved bandwidth value in the range limited by the maximum and minimum values of bandwidth.

* * * * *